March 29, 1938.  R. R. APPLEGATE  2,112,552

APPARATUS FOR WELDING

Original Filed Jan. 9, 1935

INVENTOR.
ROBERT R. APPLEGATE
BY Bates, Golrick & Teare
ATTORNEYS

Patented Mar. 29, 1938

2,112,552

UNITED STATES PATENT OFFICE 2,112,552

APPARATUS FOR WELDING

Robert R. Applegate, Shaker Heights, Ohio

Original application January 9, 1935, Serial No. 1,020. Divided and this application June 2, 1937, Serial No. 146,000

5 Claims. (Cl. 219—8)

This invention relates to an apparatus for electric welding, and comprises a division of my copending application, Serial No. 1,020, filed January 9th, 1935, since matured into Patent No. 2,083,309, dated June 8, 1937. Heretofore, weld rods having a heavy coating thereon, could not be used satisfactorily on a welding machine unless a part of the coating was removed so as to facilitate contact between a contact roller and a bared portion of the rod. Consequently, in order to obtain current conducting relationship, the practice has been to cut off a narrow strip of the coated rod by a rotary cutter which engages the rod in advance of the current conducting roller.

This procedure enables a satisfactory contact to be made between the rod and the current contacting wheel, but the presence of the slot in the covering causes the weld metal to splatter in such region and thereby results in an unsatisfactory condition of the work at the completion of the welding operation.

To avoid the objectionable splatter, the practice has been to use a welding rod which has a dust-like coating thereon. This enabled the current conducting wheel to make good contact with the weld rod, but it sacrificed the ductility of the resulting weld.

An object of the present invention therefore is to provide an arrangement whereby a heavily coated electrode may be used in an automatic welding machine so as to obtain the desired degree of ductility in the weld, without resulting in the objectionable splatter heretofore described.

Figure 1:
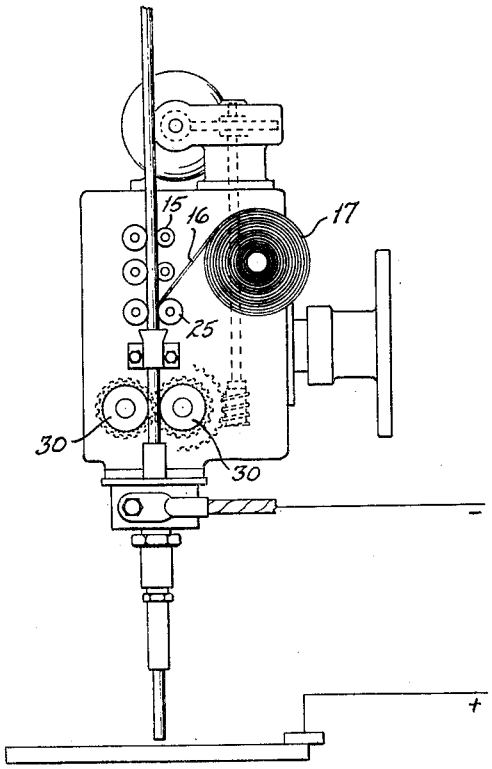
Figure 2:
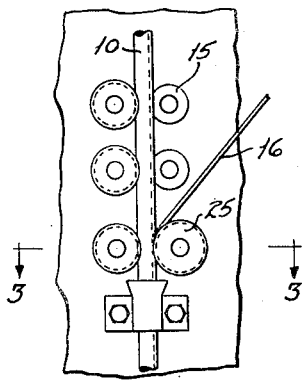
Figure 3:
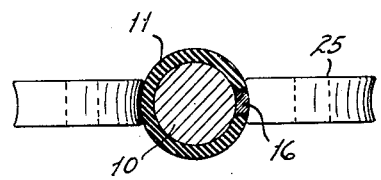

Referring now to the drawing, Fig. 1 is a front view of the head of a welding machine with which my invention is intended to be used; Fig. 2 is a diagrammatic view showing a part of the machine on a scale larger than that illustrated in Fig. 1; and Fig. 3 is a section taken on the line 3—3 in Fig. 2.

The electrode with which the present invention is adapted for use, comprises a rod 10 which has a relatively heavy coating 11 that is applied thereto in the form of a thick sleeve and usually by an extruding process. I am not concerned in this application with the ingredients of which the covering is made, it being sufficient to state that any commercial form of heavy covering may be utilized. Moreover, I am not concerned with a method of removing the narrow strip for it may be removed, either before, or while the rod is passing through the welding head. For the purposes of illustrating the use of the present invention, the welding head is shown as having a current conducting wheel 15 in contact with the bared strip on the rod.

To close the slot in the covering so as to produce an electrode which comprises substantially a continuous envelope around the rod, I insert a filler strip into the slot after contact has been made between the rod and the wheel 15. In the preferred arrangement, the strip is inserted in the form of a flexible cord 16 which may be supported on a reel 17, while the reel in turn may be journaled on the welding head. A roller 25 forces the filler strip into the slot and simultaneously presses it firmly against the rod. By making the filler of such size that it fits snugly within the slot it will remain in such position during the welding operation. The feed rolls 30 operate to move the rod and filler strip simultaneously and to feed them as a unit through the welding head.

While I have shown a filler in the form of a strip, I may if desired make it in the form of a paste and feed it with the electrode in such manner as to fill the slot progressively as the electrode is advanced through the head.

By means of my invention, heavily coated electrodes may be fed through the head of a welding machine without entailing any difficulty in making an electrical contact, and without producing objectionable spattering of the welding metal.

I claim:

1. In combination, a coated electrode having a bared portion extending longitudinally thereof, and means for filling the bared portion at the time of use of the electrode.

2. In combination, an electrode having a coating thereon, and having a bared portion extending longitudinally thereof, means for feeding the electrode through the head of a welding machine and other means for closing the bared portion while the electrode is in motion to provide a substantially continuous envelope around the electrode.

3. In combination, a coated electrode having a bared portion extending longitudinally thereof, a current conducting contactor carried by the head of an electric welding machine and engaging the bared portion for feeding current to the electrode during the welding operation, and means positioned between the contactor and the arc end of the electrode for closing the bared portion so as to provide a substantially continuous coating around the electrode.

4. In combination, a coated electrode having a bared portion extending longitudinally thereof, means for feeding the electrode through the head of a welding machine, and means for feeding a filler strip against the bared portion simultaneously with the electrode.

5. In combination, a coated electrode having a slot extending through the coating in a longitudinal direction and means for inserting a filler strip into the slot at the time of use of the electrode.

ROBERT R. APPLEGATE.